United States Patent
Sakaki et al.

(10) Patent No.: US 6,337,364 B1
(45) Date of Patent: Jan. 8, 2002

(54) LOW MODULUS OF ELASTICITY-RUBBER COMPOSITION

(75) Inventors: Toshiaki Sakaki, Kakogawa; Tetsuo Mizoguchi, Nishinomiya, both of (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/500,484

(22) Filed: Feb. 9, 2000

(30) Foreign Application Priority Data

Feb. 10, 1999 (JP) .......................................... 11-032929

(51) Int. Cl.$^7$ ................................................. C08J 5/24
(52) U.S. Cl. .................... 524/270; 526/335; 526/348.2; 526/282
(58) Field of Search ........................ 524/80, 81, 270; 526/282, 335, 348.2

(56) References Cited

U.S. PATENT DOCUMENTS 4,645,793 A * 2/1987 Von Hellens et al. ....... 524/518

FOREIGN PATENT DOCUMENTS

| EP | 0564267 | 10/1993 |
|---|---|---|
| JP | B2-5724828 | 5/1982 |
| JP | A5927931 | 2/1984 |
| JP | A6092380 | 5/1985 |
| JP | B2-6031875 | 7/1985 |
| JP | A465447 | 3/1992 |
| JP | A6136207 | 5/1994 |

OTHER PUBLICATIONS

Database WPI, Section Ch, Week 197748, XP002136219, Oct. 21, 1977.
Database WPI, sECTION cH, Week 199619, XP002136220, Mar. 5, 1996.

* cited by examiner

*Primary Examiner*—David W. Wu
*Assistant Examiner*—William Cheung
(74) *Attorney, Agent, or Firm*—Birch, Stewart, Kolasch & Birch, LLP

(57) ABSTRACT

Disclosed is a low modulus of elasticity-rubber composition, which is useful for sealing a telecommunication cable closure even in low temperature range, utilizing an ethylene-propylene-diene rubber. Said low modulus of elasticity-rubber composition comprising (1) an ethylene-propylene-diene rubber [Mooney viscosity (100° C.): 90 to 130° C., diene: ethylidenenorbornene, iodine value: not more than 20, ethylene content: not more than 55% based on the total amount of ethylene and propylene] and (2) a softener [pour point: not more than −40° C., SP value: 6 to 8], the component (2) being contained in the amount of 300 to 700 parts by weight based on 100 parts by weight of the component

7 Claims, No Drawings

LOW MODULUS OF ELASTICITY-RUBBER COMPOSITION

BACKGROUND OF THE INVENTION

The present invention relates to a low modulus of elasticity-rubber composition prepared by containing a softener in an ethylene-propylene-diene rubber. More particularly, the present invention relates to a low modulus of elasticity-rubber composition comprising an ethylene-propylene-diene rubber and a softener, which shows small compression set even at wide range of temperature, especially at low temperature ranging from −30 to 0° C., excellent flexibility and self-tack, and is useful as a sealant for a telecommunication cable closure.

An ethylene-propylene-diene rubber (hereinafter abbreviated to EPDM, sometimes) is a terpolymer and is utilized as a rubber composition. With respect to the ethylene-propylene-diene rubber, for example, publicly known techniques described in the following patent publications have been known.

Japanese Patent Publication (Kokoku) No. 57-24828: This publication discloses a sealing process, which comprises molding a low-temperature vulcanizable composition prepared by adding a peroxide and a redox catalyst to a rubber-like polymer containing, as a main component, an olefin terpolymer comprising ethylene, α-olefin and polyene having a non-conjugated double bond, and optionally mixing an optional component such as filler and softener.

Japanese Patent Laid-open Publication (Kokai) No. 59-27931: This publication describes a rubber composition comprising an ethylene-α-olefin-polyene copolymer rubber wherein a molar ratio of ethylene to α-olefin having 4 or more carbon atoms is from about 80:20 to 97:3, and a diene rubber, and also describes that a softener as one of optional components to be added in the rubber composition can be mixed in the amount of about 100 parts by weight or less based on 100 parts by weight of the rubber composition, however, the strength is lowered when the softener is mixed in the amount larger than the above amount.

Japanese Patent Publication (Kokoku) No. 60-31875: This publication describes a solvent-free type unsteady sealing material prepared by adding 150 to 1000 parts by weight of a softener and 50 to 1000 parts by weight of silcas and/or short fibers to 100 parts by weight of rubbers containing an ethylene-propylene-diene rubber. By the way, any reference with respect to properties of the ethylene-propylene-diene rubber to be used is not made.

Japanese Patent Laid-Open Publication (Kokai) No. 60-92380: This publication describes a porous sealing agent comprising ethylene, α-olefin and diolefin as a monomer component, wherein 100 parts of a copolymer having a Mooney viscosity (100° C.) of 5 to 30 and 30 to 150 parts by weight of a softener are contained.

Japanese Patent Laid-Open Publication (Kokai) No. 4-65447: This publication describes a rubber composition for seal parts, which is prepared by adding 20 to 50 parts of a naphthenic or paraffinic process oil as a softener and an antioxidant to an ethylene-α-olefin-diolefin copolymer composition defined by 55 to 70 mol % of an ethylene content, 50 to 100 of a Mooney viscosity (121° C.) and 5 to 24 of an iodine value.

Japanese Patent Laid-Open Publication (Kokai) No. 6-136207: This publication discloses an oil-bleeding chlorinated ethylene-α-olefin copolymer composition comprising 100 parts by weight of a chlorinated ethylene-α-olefin copolymer rubber having a Mooney viscosity at 121° C. of 10 to 190 and 10 to 60 parts by weight of an paraffinic process oil, wherein the chlorine content is from 20 to 40% by weight, and also describes that this composition can be used as a polymer for molding a connector, a packing and a housing of an electric circuit.

As described above, various EPDM rubber composition containing different components for various purposes have been known and, as a matter of course, required characteristics vary depending on the purposes.

When using the EPDM rubber composition for sealing in the field of a telecommunication cable closure, it is required that the composition shows small compression set even at wide range of temperature, especially at low temperature ranging from −30 to 0° C., and excellent flexibility. The "closure" used herein means a container for branching and connecting an electric wire and an optical fiber.

However, it is difficult to provide the previously known EPDM composition for sealing in low temperature range in view of characteristics. In case of a conventional composition, since the compression set at −20° C. exceeds 90% and a change in hardness between room temperature and −20° C. is very large, there is a fear that the sealability at low temperature such as −20° C. is lowered to cause leakage. There is also a problem that compression required for sealing can not be conducted sufficiently as a result of an increase in hardness. In case of almost all of compositions, it is difficult to compress because of poor flexibility and to closely contact with the cable because of poor tack.

In order to solve the problems described above, the present inventors have studied intensively to improve the EPDM rubber composition. As a result, they have found that a rubber composition, which shows small compression set even at low temperature and excellent flexibility, can be obtained by containing a combination of EPDM having specific properties and a softener having specific properties in a specific ratio. Thus, the present invention has been completed by studying furthermore.

SUMMARY OF THE INVENTION

That is, the present invention provides:

1) a low modulus of elasticity-rubber composition comprising an ethylene-propylene-diene rubber and a softener, wherein
   (1) the ethylene-propylene-diene rubber has the following properties:
     (a) a Mooney viscosity at 100° C. is from 90 to 130,
     (b) a diene is ethylidenenorbornene,
     (c) an iodine value is not more than 20, and
     (d) the amount of ethylene is not more than 55% based on the total amount of ethylene and propylene;
   (2) the softener has the following properties:
     (a) a pour point is not higher than −40° C., and
     (b) a SP value is from 6 to 8; and
   the softener is contained in the amount of 300 to 700 parts by weight based on 100 parts by weight of the ethylene-propylene-diene rubber, and
2) the low modulus of elasticity-rubber composition according to the term 1), which is vulcanized.

The low modulus of elasticity-rubber composition of the present invention is suited for use as a seal material of a telecommunication cable closure because it shows flexibility, small compression set even at low temperature range, and excellent tack.

DETAILED DESCRIPTION OF THE INVENTION

EPDM used in the rubber composition of the present invention has properties specified by the terms (a), (b) and (d), as described above. With such a composition, the rubber composition shows low elasticity and the JIS A hardness is usually not more than 10. Herein, JIS is abbreviation of Japanese Industrial Standard.

The Mooney viscosity is an index of the molecular weight of EPDM. The higher the molecular weight, the higher the viscosity becomes. To the contrary, the lower the molecular weight, the lower the viscosity becomes. In the present invention, EPDM having the Mooney viscosity at 100° C. within a range from 90 to 130, preferably from 100 to 120, is used. When the molecular weight of EPDM is high, there is a merit of increased strength. On the other hand, it becomes difficult to fill with a large amount of softener and tack of the rubber after vulcanization becomes poor. A high-molecular weight EPDM having the Mooney viscosity of higher than 130 is not preferred for the reasons described above. On the other hand, when the Mooney viscosity is lower than 90, it is possible to fill with a large amount of softener such as oil and the tack is good, however, the vulcanized article is scarcely fit to use because of drastic reduction in strength. EPDM having the Mooney viscosity of about 100 to 120 is preferably used.

The iodine value of EPDM is an index of the amount of the diene component in this rubber, that is, the larger the iodine value, the larger the amount of the diene component. When the iodine value increases, the reactivity increases, thereby facilitate the vulcanization; however, deterioration of the aging resistance and weathering resistance caused by the diene component are liable to occur. In the present invention, EPDM having the iodine value of not more than 20 is selected in view of the aging resistance and weathering resistance. As the diene constituting EPDM, ethylidenenor-bornene (ENB) is used; however, there is a merit that the vulcanization rate is increased whereby.

When the amount of ethylene is represented by a proportion of the amount of ethylene based on the total amount of ethylene and propylene in EPDM, those having a ratio of not more than 55% are selected. When the amount of ethylene is high, there is a merit that the strength of the rubber increases; however, there is a drawback that crystallization occurs at low temperature. Usually, EPDM having the ethylene proportion of about 50 to 75% is available, and those having the ethylene proportion of not more than 55%, preferably about 50%, may be selected among them. When the ethylene proportion is not more than 55%, the compression set is noticeably improved even at −20° C. or lower as compared with those having the ethylene proportion of about 70%.

Next, the softener used in the rubber composition according to the present invention is that having a pour point of not more than −40° C., the measurement procedure of which is defined in JIS K2269, and a SP (Solubility Parameter) of 6 to 8. By selecting the one having the pour point of not more than −40 ° C., this rubber composition can maintain the flexibility and retain good transformability even at a low temperature range.

When the softener is added in the rubber, a combination of the rubber and softener, which have high affinity each other, is selected. In the present invention, the softener having the SP value of 6 to 8 is selected. As a result, it becomes possible to mix the softener in a large amount such as 300 to 700 parts by weight based on 100 parts by weight of EPDM having the SP value of about 7 to 8.

The softener having the above pour point and SP value can be used in the present invention without being specifically limited, but is selected particularly preferably from paraffinic process oil and oil made of a low molecular weight component of ethylene-propylene. The viscosity of the softener is not specifically limited, but the one having a higher dynamic viscosity, e.g. dynamic viscosity of not less than 50 at 40° C., is preferably used because the tack of the resulting vulcanized rubber becomes higher.

Specific examples of the softener include those which are commercially available by the trade name of Diana Process oil PX-32 or PX-90 (IDEMITSU KOSAN CO., LTD.), Stanol LP40 (Esso Petroleum Co., Ltd.) and Lucant HC-10 (MITSUI CHEMICALS, INC.).

In the composition of the present invention, the softener is preferably added in the amount within a range from 300 to 700 parts by weight, and more preferably from 300 to 500 parts by weight, based on 100 parts by weight of EPDM. The specific amount of the softener is appropriately decided according to the purposes of the rubber composition of the present invention so that required characteristics are obtained. For example, when using as a telecommunication cable closure, it is required that the composition has the flexibility and shows small compression set at temperature ranging from low temperature to high temperature, i.e. −30° C. to 60° C. In this case, the hardness(JIS K 2220) at normal temperature at 23° C. is desirably not less than 50 when the hardness is represented by penetration of a 1/1 corn into the rubber composition, preferably not less than 65, and more preferably not less than 80. When the hardness is smaller than 50, it is too hard and the sealability is lowered. When the upper limit of the penetration is not less than 100, the tack increases excessively and the amount of the softener increases largely, which is not preferred. The specific amount of the softener is selected in such way, but varies depending on the other mixing conditions, as a matter of course.

The rubber composition of present invention is preferably vulcanized for the purpose of, reducing the compression set, thereby enhancing the flexibility. Sulfur or a sulfur-containing compound may be used for vulcanization. Generally, vulcanizate with a peroxide exhibits good compression set specifically at hither temperature range. On the other hand, the vulcanizate with sulfur, wherein molecular is more mobile, is preferably applied at lower temperature range. When using EPDM whose propylene content is comparatively large, there is a fear that the use of the peroxide leads to deterioration of the rubber.

If necessary, reinforcers, fillers, flame retardants, tackifiers, vulcanization activators, pigments, processing aids, vulcanization accelerators, ultraviolet stabilizers, or antixodants can be added to the rubber composition of the present invention as exemplified as below (addition amounts are based on 100 parts by weight of the ethylene-propylene-diene rubber).

As said reinforcer, for example, silica or carbon black can be added in the amount of 0 to 300 parts by weight.

As said filler, for example, calcium carbonate, clay or magnesium carbonate can be added in the amount of 0 to 300 parts by weight.

As said flame retardant, for example, aluminum hydroxide and antimony trioxide can be added in the amount of 0 to 10 parts by weight.

As said tackifier, for example, coumarone-indene resin, aliphatic hydrocarbon resin, alicyclic hydrocarbon resin, or low molecular weight component such as liquid polybutene or liquid polyisoprene can be added in the amount of 0 to 200 parts by weight. The low molecular weight component having the SP value of 6 to 8 and the pour point of not more than −40° C., such as liquid polybutene or liquid polyisoprene, can be used as softener in the present invention.

As said vulcanization activator, for example, zinc oxide or stearic acid can be used in the total amount of 3 to 200 parts by weight.

As said pigment, for example, any of organic or inorganic pigment can be used, and examples thereof include lithopone, titanium oxide or carbon black.

As said processing aid, for example, stearic acid or fatty ester can be used in the amount of 0 to 50 parts by weight. As said vulcanization accelerator, for example, thiazole, thiuram, dithiocarbamate or sulfenamide vulcanization accelerator can be used in the amount of about 2 to 20 parts by weight.

The rubber composition of the present invention is produced by mixing EPDM with the softener and kneading the mixture. The softener is added in the amount of 300 to 700 parts by weight, as described above, however, the other additives are not sufficiently dispersed in the rubber when this amount of the softener is added in EPDM in one dose. There is also a problem that the softener is hardly mixed with EPDM uniformly and it requires a very long time to mix then completely. To avoid the problem, all the additives other than the softener and about 0 to 100 parts by weight of the softener should be sufficiently dispersed. Thereafter, when the remaining softener is introduced in one or several doses, a uniform rubber composition can be efficiently obtained. A conventional kneader can be used in the kneading operation.

EXAMPLES

The following Examples and Comparative Examples further illustrate the present invention in detail. The quality of the rubber composition was evaluated by the following procedure.

[Test procedure]

Compression set: It was measured in accordance with JIS K6262 under the condition that the compressing time was 24 hours and the temperature was −20° C. The thickness was measured immediately after removing of compression, since the compression set would be reduced with the raise of the temperature.

The compression set at −20° C. is preferably not more than 40% so that the rubber composition can be used as a sealant even at low temperature.

Penetration: It was measured by using a cone A in 1/1 size according to the consistency measuring procedure defined in JIS K2220. The measuring temperature was adjusted to 23° C.

Appearance: Bleed of the softener was evaluated by visually observing the subject or feeling it with tip of fingers according to the following criteria.

○: no feel of bleed by touch

Δ: bleed is visually observed, but feel slight bleed by touch

×: bleed is visually observed

Tack: It was evaluated by feeling the subject with tip of fingers according the following three-grade criteria:

○: inevitable tack

Δ: slightly poor tack

×: poor tack

Strength: It was evaluated by making a cut in the subject using a knife, pulling it with hands, and observing whether the cut is enlarged or not according the following three-grade criteria.

○: cut hardly propagates

Δ: requires careful handling because cut propagates when pulling largely

×: not suited for practical use because of drastic propagation of cut

Examples 1 to 3

100 Parts by weight of Esprene 532 as EPDM (content of ethylene based on the total amount 100 of ethylene and propylene: 50% by weight, Mooney viscosity at 100° C.: 110, iodine value: 12 g/100 g, diene component: ENB) manufactured by Sumitomo Chemical Co., Ltd. and additives shown in Table 1 were kneaded using a kneader.

TABLE 1

| Components | Parts by weight |
|---|---|
| Zinc oxide | 150 |
| Stearic acid | 4.5 |
| CB (GPF) | 5 |
| Vulcanization accelerator M | 1 |
| Vulcanization accelerator TET | 0.5 |
| Vulcanization accelerator BZ | 0.5 |
| Sulfur | 1 |
| Total | 262.5 |

Parts are by weight based on 100 parts by weight of EPDM

CB (GPF): carbon black (grade: N660)

M: 2-mercapto benzothiazole

TET: tetraethylthiuram disulfide

BZ: zinc dibutyl dithiocarmate

After kneading, EPDM was crushed into powders. First, 100 parts by weight of a softener (paraffinic process oil manufactured by IDEMITSU KOSAN CO., LTD. by the trade name of Diana PX-90, pour point: −45° C., dynamic viscosity: 110 cSt at 40° C., SP value: 7.1) was introduced into the kneaded powder. At this stage, they were kneaded until a sufficient torque is applied during the kneading. The dispersibility of the respective components in the resulting rubber composition was very good. While kneading this rubber composition, the remaining softener was further introduced in three doses. The total amount of the softener was adjusted to three levels, for example, 450, 350 and 650 parts by weight based on 100 parts by weight of EPDM, which were taken as Examples 1, 2 and 3, respectively. After the completion of the kneading, the rubber composition was vulcanized to form a predetermined shape, which was subjected to tests. The results are also shown in Table 2.

Comparative Examples 1 and 2

In the same manner as in the above Example, except that the amount of the softener was changed to 250 parts by weight (Comparative Example 1) or 800 parts by weight (Comparative Example 2) as shown in Table 2, the rubber, softener, and other ingredients were kneaded to prepare a composition, respectively. The results of the tests are shown in Table 2.

Comparative Example 3

In the same manner as in the above Example, except that 100 parts by weight of Esperene 532 was used as EPDM and 650 parts by weight of Diana PW-380 (paraffinic process oil manufactured by IDEMITSU KOSAN CO., LTD.) was used as the softener as shown in Table 2, a rubber composition was prepared. The results of the tests are shown in Table 2.

Comparative Example 4

In the same manner as in the above Example, except that 200 parts by weight (containing 100 parts by weight of extension oil) of Esperene 670F (manufactured by Sumitomo Chemical Co., Ltd.) was used as EPDM and 350 parts by weight of Diana PW-380 was used as the softener as shown in Table 2, a rubber composition was prepared. The results of the tests are shown in Table 2.

Comparative Example 5

In the same manner as in the above Example, except that 200 parts by weight (containing 100 parts by weight of extension oil) of Esperene 670F was used as EPDM and 350 parts by weight of Diana PX-32 (paraffinic process oil manufactured by IDEMITSU KOSAN CO., LTD.) was used as the softener as shown in Table 2, a rubber composition was prepared. The results of the tests are shown in Table 2.

Comparative Example 6

In the same manner as in the above Example, except that 100 parts by weight of Esperene 505A (manufactured by Sumitomo Chemical Co., Ltd.) was used as EPDM and 350 parts by weight of Diana PW-380 was used as the softener as shown in Table 2, a rubber composition was prepared. The results of the tests are shown in Table 2.

TABLE 2

|  | Example 1 | Example 2 | Example 3 | Comp. Example 1 | Comp. Example 2 |
|---|---|---|---|---|---|
| EPDM | Esprene 532 | Esprene 532 | Esprene 532 | Esprene 532 | Esprene 532 |
| Ethylene content (%) | 50 | 50 | 50 | 50 | 50 |
| Mooney viscosity ML(1 + 4)(100° C.) | 110 | 110 | 110 | 110 | 110 |
| Iodine value (g/1000 g) | 12 | 12 | 12 | 12 | 12 |
| Diene component | ENB | ENB | ENB | ENB | ENB |
| Softening agent | Diana PX-90 | Diana PX-90 | Diana PX-90 | Diana PX-90 | Diana PX-90 |
| Parts by weight | 450 | 350 | 650 | 250 | 800 |
| Pour point (° C.) | −45 | −45 | −45 | −45 | −45 |
| SP value | 7.1 | 7.1 | 7.1 | 7.1 | 7.1 |
| Penetration | 95 | 64 | 145 | 38 | 173 |
| Tack | ○ | ○ | ○ | ○ | ○ |
| Appearance | ○ | ○ | ○ | ○ | ○-Δ |
| Strength | ○ | ○ | Δ | ○ | X |
| Compression set (−20° C.) | 20 | 20 | 24 | 22 | 24 |

|  | Comp. Example 3 | Comp. Example 4 | Comp. Example 5 | Comp. Example 6 |
|---|---|---|---|---|
| EPDM | Esprene 532 | Esprene 670F | Esprene 670F | Esprene 505A |
| Ethylene content (%) | 50 | 70 | 70 | 55 |
| Mooney viscosity ML(1 + 4)(100° C.) | 110 | 230* | 230* | 45 |
| Iodine value (g/1000 g) | 12 | 12 | 12 | 24 |
| Diene component | ENB | ENB | ENB | ENB |
| softening agent | Diana PW-380 | Diana PW-380 | Diana PX-32 | Diana PW-380 |
| Parts by weight | 650 | 350 | 350 | 350 |
| Pour point (° C.) | −15 | −15 | −45 | −15 |
| SP value | 6.9 | 6.9 | 7.5 | 6.9 |
| Penetration | 132 | 41 | 45 | 41 |
| Tack | ○ | X | X | ○ |
| Appearance | ○ | ○ | ○ | ○ |
| Strength | ○ | ○ | ○ | X |
| Compression set (−20° C.) | 78 | 95 | 92 | 82 |

ENB: ethylidenenorbornene, *: assumed value

As is apparent from the results of the evaluation shown in Table 2, the rubber compositions (Examples 1, 2 and 3), which are prepared by using 100 parts by weight of EPDM having an ethylene content of not more than 55%, a Mooney viscosity at 100° C. of 90 to 130 and an iodine value of not more than 20 and 300 to 700 parts by weight of a softener having a pour point of not higher than −40° C. and a SP value of 6 to 8, are flexible and show small compression set even at low temperature and, therefore, they have preferred characteristics for the sealing material.

On the other hand, when the conditions specified in the present invention are not satisfied, the rubber composition having satisfactory quality was not obtained as shown in the respective Comparative Examples.

What is claimed is:
1. A low modulus of elasticity-rubber composition comprising an ethylene-propylene-diene rubber and a softener, wherein

(1) the ethylene-propylene-diene rubber has the following properties:
 (a) a Mooney viscosity at 100° C. is from 90 to 130,
 (b) a diene is ethylidenenorbornene,
 (c) an iodine value is not more than 20, and
 (d) the amount of ethylene is not more than 55% based on the total amount of ethylene and propylene;

(2) the softener has the following properties:
 (a) a pour point is not higher than −40° C., and
 (b) a SP value is from 6 to 8; and the softener is contained in the amount of 300 to 700 parts by weight based on 100 parts by weight of the ethylene-propylene-diene rubber.

2. The low modulus of elasticity-rubber composition according to claim 1, which is vulcanized.

3. The low modulus of elasticity-rubber composition according to claim 1, wherein the Mooney viscosity of ethylene-propylene-diene rubber is from 100 to 120 at 100° C.

4. The low modulus of elasticity-rubber composition according to claim 1, wherein the softener is one or more member selected from the group consisting of a paraffinic process oil and an oil made of a low-molecular-weight component ethylene-propylene.

5. The low modulus of elasticity-rubber composition according to claim 1, wherein the softener is contained in the amount of 300 to 500 parts by weight based on 100 parts by weight of the ethylene-propylene-diene rubber.

6. The low modulus of elasticity-rubber composition according to claim 1, wherein a hardness of said composition is not less than 50 when the hardness is represented by penetration of a 1/1 corn into the composition.

7. The low modulus of elasticity-rubber composition according to claim 1, which is for as a sealant of a telecommunication cable closure.

* * * * *